United States Patent [19]
Bryers

[11] 3,902,462
[45] Sept. 2, 1975

[54] SYSTEM AND METHOD FOR GENERATING HEAT UTILIZING FLUIDIZED BEDS OF DIFFERENT PARTICLE SIZE

[75] Inventor: Richard W. Bryers, Cranford, N.J.

[73] Assignee: Foster Wheeler Energy Corporation, Livingston, N.J.

[22] Filed: May 28, 1974

[21] Appl. No.: 473,458

[52] U.S. Cl. ............... 122/4 D; 110/8 F; 110/28 J
[51] Int. Cl.² ............................................. F22B 1/02
[58] Field of Search ............ 110/8 F, 28 J; 122/4 D

[56] References Cited
UNITED STATES PATENTS

| | | | |
|---|---|---|---|
| 2,638,684 | 5/1953 | Jukkola | 110/28 X |
| 2,818,049 | 12/1957 | Blaskowski | 122/4 |
| 3,431,892 | 3/1969 | Godel | 122/4 |
| 3,763,830 | 10/1973 | Robinson et al. | 110/28 X |
| 3,823,693 | 7/1974 | Bryers et al. | 110/28 |

Primary Examiner—Kenneth W. Sprague
Attorney, Agent, or Firm—Marvin A. Naigur; John E. Wilson; John P. De Luca

[57] ABSTRACT

A system and method for generating heat in which a particulate fuel material is separated into a relatively coarse material and a relatively fine material which is transferred to separate chambers. Air is passed through the coarse material at a relatively high velocity and through the fine material at a relatively low velocity to fluidize the materials and promote their combustion.

17 Claims, 4 Drawing Figures

SYSTEM AND METHOD FOR GENERATING HEAT UTILIZING FLUIDIZED BEDS OF DIFFERENT PARTICLE SIZE

BACKGROUND OF THE INVENTION

This invention relates to a system and method for generating heat and, more particularly, to such a system and method utilizing a plurality of stacked fluidized beds.

The use of fluidized beds has long been recognized as an attractive means of generating heat. In these arrangements, air is passed through a bed of particulate material including a particulate fossil fuel, such as coal, to fluidize the bed and promote the combustion of the fuel. The basic advantages of such an arrangement includes an improved heat transfer rate, a uniform bed temperature, combustion at lower temperatures and ease of handling the fuel materials.

Also, when the heat produced by the fluidized bed is utilized to convert water to steam, such as in a vapor generator, still other advantages ensue, such as a reduction in corrosion and boiler fouling, an increase in combustiton efficiency, and a reduction in boiler size. However, in a vapor generator environment there is an inherent limitation on the range of heat input to the water passing in a heat exchange relation to the fluidized bed, largely due to the fact that the quantity of air supplied to the bed must be sufficient to maintain same as in a fluidized condition yet must not cause excessive quantities of the fuel material to be blown away.

In U.S. patent application Ser. No. 324,041, filed Jan. 16, 1973, now U.S. Pat. No. 3,823,693 and assigned to the same assignee of the present application, a vapor generator is disclosed in which a plurality of fluidized beds are vertically aligned which retains the advantages of the fluidized bed set forth above yet enables a relatively large range of heat transfer to be obtained. The disclosure of this application is hereby incorporated by reference.

Although this latter arrangement enjoys distinct advantages over the prior art, further problems were encountered in accommodating bed materials of a relatively large range of sizes. (For purposes of this specification, the term bed materials is meant to include a mixture of particulate materials, including an inert material, a fuel material such as high sulfur bituminous coal, and a sorbent material for the sulfur formed as a result of the combustion of the coal.) These problems resulted from the fact that the fine materials in the fluidized bed or beds in the heat exchanger were blown out from the generator and thus had to be collected in dust collectors, or the like. Although this could be avoided by operating the beds at a relatively low gas velocity, it required an increase in the size of the primary beds, the dust collectors and associated equipment, which added to the cost and size of the complete system.

Although in the arrangement of the application noted above, a secondary bed was provided for combusting the fines blown out from the primary beds in an attempt to more conveniently dispose of the fines elutriated from the primary beds and thus permit higher bed velocities, the combustion in the secondary bed was somewhat difficult since the fines were relatively unreactive due to the fact that their volatiles had been driven off and the carbon partially oxidized during their passage through the primary beds.

SUMMARY OF THE INVENTION

It is, therefore, an object of the present invention to provide a system and method for generating heat which enjoys the advantages of fluidized beds including the use of a relatively large range of heat transfer, yet enables an optimum, efficient use of a fuel with a relatively large size range.

It is a further object of the present invention to provide a system and method for generating heat in which the entrainment of the relatively fine fuel in the air/gas stream passing through the fluidized beds is considerably reduced when compared to previous arrangements.

It is a further object of the present invention to provide a system and method for generating heat which includes at least two fluidized beds — one for accommodating relatively coarse fuel and the other for accommodating relatively fine fuel.

It is a further object of the present invention to provide a vapor generating system and method incorporating the features of the heat generating system and method noted above.

Toward the fulfillment of these and other objects, the system of the present invention comprises means for separating a particulate fuel material into a relatively coarse particulate material and a relatively fine particulate material, means defining at least two chambers, means for transferring said relatively coarse material from said separating means to one of the chambers, means for passing air through said one chamber at a relatively high velocity to fluidize said relatively coarse material and promote the combustion of said relatively coarse material, means for transferring said relatively fine material from said separating means to another chamber, and means for passing air through said other chamber at a relatively low velocity to fluidize said relatively fine material and promote the combustion of said relatively fine material.

DESCRIPTION OF THE PREFERRED EMBODIMENT

Figure 1:
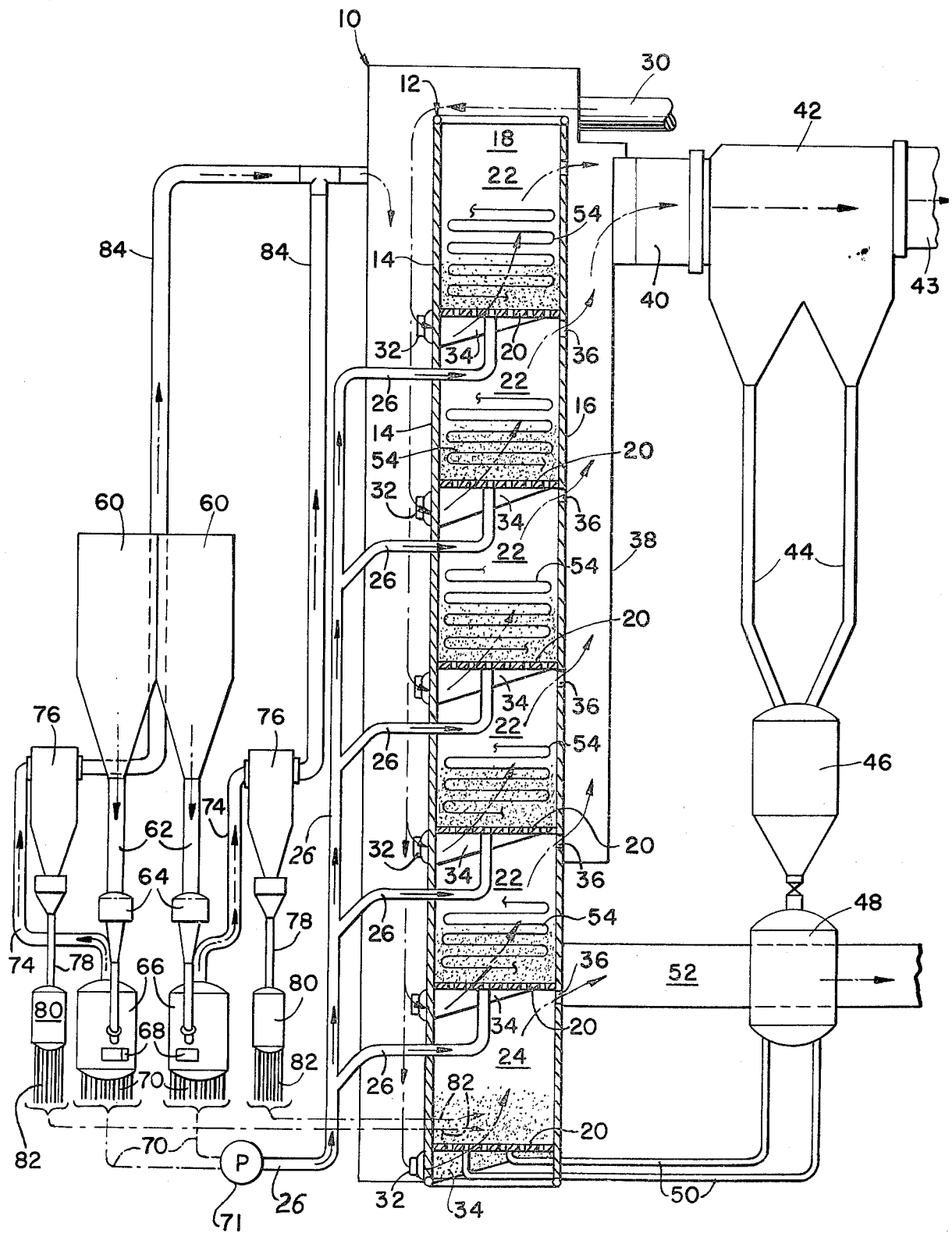
FIG. 1 is a partial elevational, partial sectional view of the system of the present invention.

Referring specifically to the drawing, the reference numeral 10 refers in general to a housing having several openings for the passage of air and for receiving pipes as will be described in detail later. An enclosure 12 is defined within the housing and comprises a front wall 14, a rear wall 16 and two side walls, one of which is shown and referred to by the reference numeral 18. It is understood that each wall is formed by a plurality of finned tubes welded together in a conventional manner and extending for the entire length of the wall for reasons to be described in detail later.

A plurality of air distribution plates 20 are disposed in a spaced relationship in the enclosure 12 to divide the enclosure into a plurality of vertically aligned chambers, or compartments. The five upper compartments are substantially identical, and are each referred to by the reference numeral 22. The lowermost compartment is referred to by the reference numeral 24 and is functionally different from the compartments 22 as will be explained later.

Fuel is injected into each compartment 22 via feed lines 26 extending through suitable openings provided in the housing 10 and the wall 14, and passing through their respective distributor plates 20. The lines 26 and the chamber 24 are supplied with fuel in a manner to be described later. Each plate 20 supports the bed material which extends to a generally intermediate height in each of the compartments 22 and 24.

Air from an external source is passed into the housing 10 via an inlet 30 and is passed in a direction shown by the dashed arrows to the area defined between the front wall 14 of the enclosure 12 and the corresponding wall of the housing 10, where it passes in six separate streams through a damper 32 and into an air plenum chamber 34 extending below each distribution plate 20.

As a result, the bed materials in each compartment 22 and 24 are fluidized and, once the fuel material is ignited, its combustion will be promoted to obtain economical burning or heat release rates per unit of area bed.

The heated air, after passing through the fluidized beds in the chambers 22 and 24, discharged as combustion gases through outlets 36 provided in the rear wall 16, as shown by the dashed arrows, where it flows into a duct 38 disposed to the rear of the wall 16. The gases are directed from the duct 38, through a duct 40 and to a cyclone type dust collector 42 which removes the fine coal particles entrained in the gases. It is understood that the gases with the fines thus removed are then passed, via a duct 43, through an air heater (not shown) and to an exhaust stack, or the like, with the air heater functioning to pass the relatively warm gases in a heat exchange relationship with the air entering the system to preheat the latter air before it is passed into the housing 10 through the inlet 30.

After being separated out of the combustion gases by the dust collector 42, the fine bed particles, which include fragments of the unburned fuel material, are directed via lines 44 to a dust hopper 46, and then into an injector 48 which injects the particles back into the compartment 24 via lines 50. The fine particles in the compartment 24 are fluidized by air passing into this compartment through a damper 32 and an air plenum chamber 34 associated therewith to promote combustion of the fuel material in a similar manner to that described in connection with the fuel material in the compartments 22. The combustion gases from the compartment 24 exit through its outlet 36 and into a duct 52 adjacent the chamber 38 whereby they may be directed to another station for further treatment.

A tube bundle 54 is disposed in each fluidized bed in the compartments 22. Although each tube bundle 54 is represented by only a single tube in the drawing, it is understood that each tube bundle consists of a plurality of juxtapositioned tubes extending across the entire width of the enclosure 12. Although not shown in the drawing, it is understood that the tubes bundles are connected by means of feeder tubes, downcomers, etc., in a manner to direct water, or other fluid, through the respective beds in a sequence determined by their respective connections, to gradually raise the temperature of the water. For example, the tube bundles 54 disposed in the lower two compartments 22 could be connected in series, with one of same adapted to receive the water at a predetermined temperature, and the other adapted to discharge the water to another stage of the system after it is heated further in the tube bundles. The other tube bundles 54 in the remaining compartments 22 could be individually connected to a steam turbine or adapted for use for reheating, all in accordance with the specific disclosure of the above-identified application.

Although also not shown in the drawing, it is understood that an additional series of tubes can be provided in the enclosure 12 that extend for the entire length thereof in a serpentine relationship to form a plurality of banks respectively disposed in the compartments 22 above each tube bundle 54 to enable the water passing into the system to be preheated before being passed through the fin tube walls and the tube bundles as also disclosed in the above-identified application.

The system for distributing fuel to the lines 26 and additional fuel to the chamber 24 is disposed immediately adjacent the housing 10 and includes a plurality of receiving bunkers 60 for receiving and storing the bulk bed materials. Downspouts 62 register with the outlet of the bunkers 60 and connect same to a volumetric feeder 64 associated with each bunker. The feeders 64 regulate the feed of the fuel to the system by means of a weir and a variable speed belt (not shown) in a conventional manner. The bulk fuel flows by gravity from the feeders 64 to dryer and distributor units 66, respectively, connected to the feeders.

Heated air is introduced into the units 66 through inlet openings 68 disposed to either side therof. The heated air passes through the accumulation of bulk fuel in each unit 66, and entrains the fine fuel and thus separates same from the coarse materials, in a manner to be described in detail later.

The coarse materials are fed from the lower portion of each unit 66 via a plurality of pneumatic transport lines 70 to a jet pump 71, with the connection between the lines and the pump being shown schematically for the convenience of presentation. The outlet of the pumps 71 is connected to main feed lines 26 which have a vertical portion extending immediately adjacent the housing 10. The feed lines 26 each register with the fluid beds 22 for distributing the relatively coarse fuel into the beds 22 as described above.

The heated air having been cooled in the process of drying the fuel passes through the units 66 with the fine bed materials entrained therein and are directed, via lines 74, into cyclone separators 76 associated with each line which operate in a conventional manner to separate the fine fuel from the air. The fine fuel collected in the cyclone separators 76 are passed, via lines 78, into surge bins 80, and from the latter, into a plurality of pneumatic transport lines 82, portions of which are shown schematically, which inject the fine materials directly into the secondary bed formed in the chamber 24.

The relatively clean air from the cyclone separators 76 is passed via lines 84 into the housing 10 as shown by the dashed arrows where it combines with the air from the inlet 30 servicing the individual beds as discussed above.

Although not clear from the drawing, it is understood that in a typical system there would be two receiving bunkers 60 associated with each dryer and distributor unit 66, with the associated feeders 64 emptying into either side of the latter units making a total of four bunkers and four feeders in the system of FIG. 1.

Figure 3:
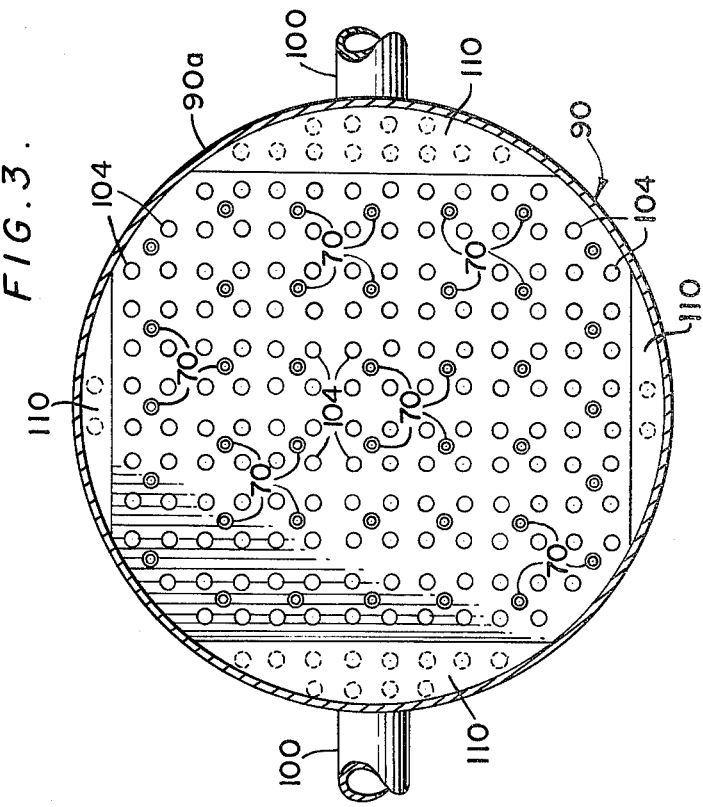
FIGS. 3 and 4 are sectional views taken along the lines 3—3 and 4—4, respectively, of FIG. 2.
Figure 4:
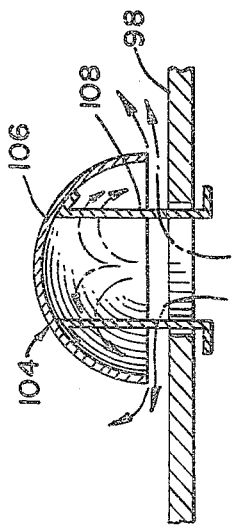
Figure 2:
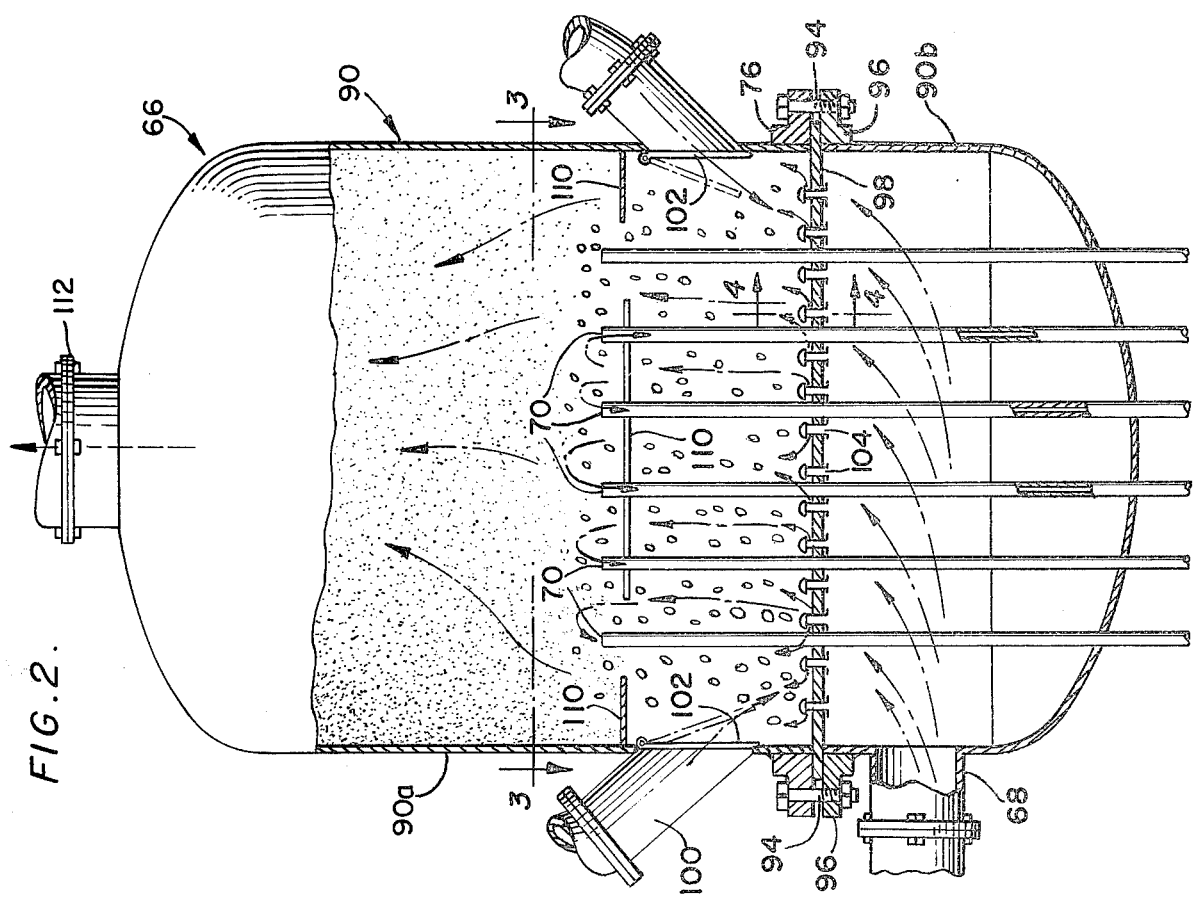
FIG. 2 is a partial elevational, partial sectional view of a unit incorporated in the system of FIG. 1.

The details of a dryer and distributor unit 66 is shown in FIGS. 2–4. In particular, the unit comprises a housing 90 having an upper portion 90a connected to a lower portion 90b by means of a plurality of bolts 94 extending through facing flanges 96 disposed on the housing members. A perforated plate 98 extends across the unit at the junction between the housing portions 90a and 90b and is fastened between the flanges 96. The upper end portion of the tubes 70 extend through a portion of the openings in the plate 98 and are supported thereby. The connections from the volumetric feeders 64 are shown by the reference numerals 100 and register with two openings in the wall of the housing 90 to introduce the bulk fuel into the housing, via flap valves 102.

A plurality of floating air deflectors 104 extend through the remaining openings provided through the plate 98 and are better shown with respect to FIG. 4. In particular, each deflector 104 comprises a curved head portion 106 that is affixed to a pair of stems 108 extending through an opening in the plate 98 to permit limited slidable movement of the deflector with respect to the plate.

A plurality of baffles 110 are disposed at an intermediate level adjacent the inner surfaces of the walls of the upper housing member 90a to form a substantially rectangular opening for the air passing through the housing 90 before it exits through an outlet 112 provided through the upper end wall of the upper housing member 90a.

As a result of the foregoing arrangement, heated air introduced into the inlet 68 of the unit 66 from an external source (not shown) will flow upwardly through the housing 90 as shown by the dashed arrows, and through the openings in the plate 98 not occupied by the tubes 70 and will force the deflectors 104 upwardly causing the head portion 106 of the latter units to distribute the air radially outwardly and thus effect an even distribution of air across the plate 98. The bulk fuel is introduced into the housing 90 through the connections 100 and collect on the plate 98 where they are fluidized by the air passing through the plate. The relatively fine portion of the fuel will be entrained by the air and will pass upwardly with the air and exit through the outlet 112 and to the cyclone separators 76 for further treatment as described above. The relatively coarse materials will pass downwardly through the tubes 70 and, via the pump 71, into the main feeder lines 26 for distribution to the beds associated with each of the chambers 22.

In operation of the system of the present invention, fuel from the bunkers 60 are fed via the volumetric feeders 64 into the units 66 along with heated air. The air serves to dry the fuel and to separate the fine portion of the materials from the coarse portion as described above. The coarse materials from the units 66 are passed into the main feed lines 26 in the manner discussed above and are directed into each of the chambers 22 in the enclosure 12 to from a plurality of vertically aligned beds of material in the enclosure 12. The mixture of the materials and air from the units 66 is passed to the separators 76 and separated, with the fine materials passing, via the feeder lines 82, into the chamber 24 thereby forming a bed over the distributor plate 20 disposed in the latter chamber.

The air from the inlet 30 combines with the air from the lines 86 extending from the cyclone separators 76 before passing through the dampers 32 and into the chambers 22 and 24 to fluidize each of the beds in the latter chambers. The air passing through the fluidized beds in the chambers 22 and 24 forms combustion gases with the fuel material in the beds, after which it passes through the outlets 36, the ducts 38 and 40, and into the cyclone separator 42. The fine materials entrained by the combustion gases and the air passing through the beds are separated out in the separator 42, and are introduced, via the collector 46 and the injector 48, into the lower portion of the chamber 24 whereby they combine with the fine material from the feed line 82.

By virtue of the fact that the fluidized bed in the chamber 24 consists of relatively fine materials, the air velocity in this chamber can be set at a relatively low value by its associated damper 32 to prevent the fine materials from being blown out of the system and thus promote the combustion of the fuel portion of the materials in the bed 24. Similarly, the coarse bed materials in the chambers 22 can be fluidized at a relatively high air velocity since there is little danger of substantial loss of fine materials from these chambers.

Also, it is noted that superior combustion conditions are achieved in the chamber 24 due to the fact that substantial portion of the fuel therein is fed directly from the bulk fuel and therefore the fuel is relatively reactive and contain substantially all of their volatiles and carbon.

In addition to the advantages enunciated above, it is also noted that by virtue of firing the fine materials in the separate bed in the chamber 24, the oxygen available can be used to its fullest extend resulting in a reduction of total air requirements, and plant dry gas loss. Also, it can be appreciated that greater control over the combustion in all of the beds is achieved.

Also the present invention has been described in connection with a system in which the beds are fluidized by atmospheric air, it is understood that it also is applicable to a system in which the beds are fluidized by pressurized air. As an example of the latter system, reference is made to U.S. patent application Ser. No. 382,404, filed July 25, 1973 and assigned to the same assignee as the present invention. A co-inventor of this application is a co-inventor of the instant application, and the application is hereby incorporated by reference.

Of course, variations of the specific construction and arrangement of the system and method disclosed above can be made by those skilled in the art without departing from the invention as defined in the appended claims.

What is claimed is:

1. A system for generating heat comprising means for separating a particulate fuel material into a relatively coarse particulate material and a realtively fine particulate material, means defining at least two chambers, means for transferring said relatively coarse material from said separating means to one of said chambers, means for passing air through said one chamber at a relatively high velocity to fluidize said relatively coarse material and promote the combustion of said relatively coarse material, means for transferring said relatively fine material from said separating means to another chamber, and means for passing air through said other chamber at a relatively low velocity to fluidize said relatively fine material and promote the combustion of said relatively fine material.

2. The system of claim 1 wherein a portion of said relatively coarse material is entrained in the air passing through said one chamber, and further comprising means for separating said portion of relatively coarse material from said air and directing said portion to said other chamber.

3. The system of claim 1 wherein said means for defining said chambers comprises a housing, and partition means disposed in said housing.

4. The system of claim 3 wherein said partition means defines additional chambers in said housing which function in the same manner as said one chamber.

5. The system of claim 4 wherein said partition means extends horizontally to form a plurality of vertically aligned chambers.

6. The system of claim 1 further comprising means for passing a heat exchange medium in a heat exchange relation to said fuel material in said chambers.

7. The system of claim 1 wherein said separating means comprises a housing defining a separation chamber, means connecting said housing to a source of fuel material, means for passing air through said separation chamber to entrain said relatively fine material and separate it from said relatively coarse material.

8. The system of claim 7 wherein said separating means further comprises a cyclone separator adapted to be connected to said separating chamber for separating said air from said entrained relatively fine material, and means for passing said air to said first chamber.

9. A method of generating heat comprising the steps of separating a particulate fuel material into a relatively coarse particulate material and a relatively fine particulate material, transferring said relatively coarse material to a first chamber, passing air through said first chamber at a relatively high velocity of fluidize said relatively coarse material and promote the combustion of said relatively coarse material, transferring said relatively fine material to a second chamber, and passing air through said second chamber at a relatively low velocity to fluidize said relatively fine material and promote the combustion of said relatively fine material.

10. The method of claim 9 wherein a portion of said relatively coarse material is entrained in the air passing through said first chamber, and further comprising the step of separating said portion of relatively coarse material from said air and directing said portion to said second chamber.

11. The method of claim 9 further comprising the steps of transferring said relatively coarse material to at least one additional chamber vertically aligned with said first chamber, and passing air through said additional chamber at a relatively high velocity.

12. The method of claim 9 further comprising the step of passing a heat exchange medium in a heat exchange relation to said fuel material in ssaid chambers.

13. The method of claim 9 wherein said step of separating comprises collecting said fuel material in a separation chamber, and passing air through said separation chamber to entrain said relatively fine material and separate it from said relatively coarse material.

14. The method of claim 13 wherein said step of separating further comprises separating said air from said entrained relatively fine material, and passing said air to said first chamber.

15. An apparatus for separating particulate material comprising a housing, a perforated plate disposed in said housing and defining a chamber in said housing, means to introduce particulate material into said chamber where it accumulates on said plate, means to pass air upwardly through a portion of the perforations in said plate and into said chamber to fluidize said particulate material and entrain the relative fine particulate material, outlet means formed in the upper portion of said housing for permitting said air and entrained particulate material to discharge from said housing, and a plurality of pipes extending through the remaining portion of said perforations, one end of each of said pipes extending in said chamber for receiving the relatively coarse particulate material, the other end of each of said pipes extending externally of said housing for discharging said coarse particulate material.

16. The apparatus of claim 15 further comprising a deflector associated with each of said first portion of perforations for deflecting said air in a substantially horizontal direction.

17. The apparatus of claim 15 wherein said housing has a circular cross-section and further comprising baffle means disposed in said chamber for defining a passage of a substantially rectangular cross-section for air passing through said chamber.

* * * * *